United States Patent Office 3,470,126
Patented Sept. 30, 1969

3,470,126
WATER BASED COPOLYMER EMULSIONS CONTAINING UNSATURATED ESTERS
Kazys Sekmakas, Chicago, and Roland F. Stancl, Chicago Heights, Ill., assignors to De Soto, Inc., a corporation of Delaware
No Drawing. Filed Mar. 17, 1965, Ser. No. 440,628
Int. Cl. C08f 1/13, 15/16; C09d 5/02
U.S. Cl. 260—29.7                                   8 Claims

ABSTRACT OF THE DISCLOSURE

Water based emulsions, and especially aqueous emulsion paints having gloss or semi-gloss characteristics, are provided by copolymerizing ethylenically unsaturated materials including unsaturated esters produced either by esterifying an unsaturated fatty acid with an $\alpha,\beta$-ethylenically unsaturated alcohol or by esterifying an unsaturated fatty alcohol with an $\alpha,\beta$-ethylenically unsaturated acid. These esters are illustrated by the reaction product of crotonic acid with linoleyl fatty alcohol or by esterifying dehydrated castor fatty acids with an unsaturated alcohol. These esters are pre-emulsified using an anionic emulsifier and emulsion polymerization is effected by gradually adding vinyl monomers to the heated pre-emulsified mixture.

---

The present invention relates to film forming emulsions of copolymerized ethylenically unsaturated materials, which emulsions exhibit good adhesion to glossy and varnished surfaces. More particularly, the present invention relates to fine particle size emulsions of dispersed particles of copolymers of at least one copolymerizable monoethylenically unsaturated material with ethylenically unsaturated fatty esters containing an ethylenically unsaturated $C_4$–$C_{20}$ aliphatic group and the method of manufacturing the same. The invention particularly contemplates aqueous emulsion paints providing gloss or semigloss characteristics.

In the past, water based emulsions of copolymers of polymerizable ethylenically unsaturated materials have found relatively wide use in the field of flat wall paint. However, and due to the nature of the emulsion, these coatings lacked good adhesion to glossy or varnished surfaces. These materials are also deficient in flow and film forming properties at low temperatures and are poorly resistent to water contact, tending to blister and pop off the base.

In accordance with the present invention, the aforementioned difficulties are overcome by forming a copolymer of polymerizable monoethylenically unsaturated materials with polymerizable ethylenically unsaturated fatty esters containing an ethylenically unsaturated $C_4$–$C_{20}$ aliphatic group. Of these, the long carbon chain esters in the polymer confer on the emulsion improved adhesion to glossy and varnished surfaces and also improve the flow and film forming properties at low temperatures of the emulsion without decreasing the amount of film forming polymer within the emulsion system.

In the following specification, the term "ethylenically unsaturated fatty esterification reaction product" will be used to denote ethylenically unsaturated esters containing an ethylenically unsaturated $C_4$–$C_{20}$ aliphatic group.

Referring more particularly to the present invention, a latex emulsion base paint of very fine particle size providing good adhesion to glossy surfaces and also good flow and leveling characteristics is prepared in accordance with the invention by first emulsifying the ethylenically unsaturated fatty esterification reaction product with water. At least one polymerizable monoethylenically unsaturated monomeric material is then incrementally added to the emulsion, the monomeric material being copolymerized with the dispersed ester particles to form the fine particle size latex emulsion of the present invention.

The ethylenically unsaturated fatty esterification reaction product is prepared by reacting under esterifying conditions an ethylenically unsaturated fatty acid or alcohol derived from drying or semi-drying oils with an alpha,beta-ethylenically unsaturated alcohol or acid. Thus, the ester produced contains both the ethylenic unsaturation from the fatty material and the alpha,beta-unsaturation from the esterifying alcohol or acid.

The unsaturated fatty acid or alcohol is derived from drying and semi-drying oils such as dehydrated castor oil, linseed oil, tung oil, soybean oil, safflower oil, etc. The unsaturated fatty acids may be represented by dehydrated castor oil fatty acids and linseed oil fatty acids. The fatty alcohol may be represented by linoleyl fatty alcohol. Other fatty acids and alcohols are based directly upon the ester groups in the oils referred to above, e.g., the fatty acids derived from soybean oil and the corresponding alcohols.

While it is preferred to utilize either a fatty acid ester or a fatty alcohol ester alone, it is within the purview of the present invention to utilize mixtures of the aforementioned esters.

It is preferred to use low molecular weight esters such as mono- or diesters rather than high molecular weight resinous polyesters since such a polyester would tend to cause the system to gel.

The unsaturated fatty acid ester is prepared by esterifying the fatty acid with an alpha,beta-ethylenically unsaturated alcohol. This alcohol may be in the form of a monohydric primary alcohol such as allyl alcohol; a dihydric alcohol such as butene diol; an hydroxy ester such as 2-hydroxy ethyl acrylate, and 2-hydroxy ethyl methacrylate; or as an ether such as glycerol allyl ether, and trimethylol propane monoallyl ether. The term "alpha,beta-ethylenically unsaturated alcohol" is used so as to include all the aforementioned classes of materials and other equivalent materials.

The unsaturated fatty alcohol ester is prepared by esterifying the fatty alcohol with an alpha,beta-ethylenically unsaturated acid. The acid may be a mono acid such as acrylic, and methacrylic acid; or a diacid such as maleic, fumaric, itaconic and crotonic acids. The term "alpha,beta-ethylenically unsaturated acid" is used so as to include the aforementioned classes of materials and other equivalent materials.

The mono- or difatty ester materials are emulsion copolymerized with at least one other copolymerizable mono-ethylenically unsaturated material to form the emulsions of the present invention. The copolymerizable material may be selected either singly or as a mixture of numerous compounds from the following: methyl acrylate, ethyl acrylate, methyl methacrylate, butyl acrylate, 2-ethyl hexyl acrylate, vinyl acetate, styrene, vinyl toluene, acrylonitrile, acrylic acid, methacrylic acid, acrylamide methacrylate, hydroxyethyl acrylate, hydroxypropyl acrylate, hydroxyethyl methacrylate, glycidyl acrylate, dimethyl amino ethyl methacrylate, etc.

Preferably, the choice of unsaturated material should include a small proportion of a monoethylenically unsaturated carboxylic acid such as acrylic, methacrylic or maleic acid. The unsaturated carboxylic acid should comprise 1–4% by weight of the total weight of reaction materials.

The unsaturated fatty ester component should comprise about 5–40% by weight of the total weight of the copolymer. The remaining 60–90% by weight should comprise the unsaturated copolymerizable component.

The fine particle size latex emulsions of the present invention are prepared by incrementally adding the unsaturated copolymerizable material to a water solution which has dispersed therein the unsaturated fatty ester material. The addition is made under conditions conducive to addition copolymerization so that copolymerization takes place as the materials are added thus allowing for the formation of fine particle size emulsions. To allow copolymerization to take place as the unsaturated copolymerizable material is added to the emulsion, it is desirable that polymerization catalyst be present in the emulsion as the unsaturated copolymerizable material is added thereto. It is understood that this is not essential though it is preferred and that the polymerization catalyst can be in admixture with the unsaturated copolymerizable material as it is added to the emulsion.

The polymerization catalysts which may be used in accordance with the invention can be of the water soluble type such as potassium persulfate, ammonium persulfate and hydrogen peroxide or of the monomer soluble type such as benzoyl peroxide, cumene hydroperoxide and methyl ketone peroxide as desired. Preferably, a combination of the water soluble and the monomer soluble type catalysts is used to facilitate monomer conversion and provision of minimum emulsion particle size.

When the polymerization catalysts of the persulfate type are used, they decompose resulting in acidic products. It is preferred to use sodium bicarbonate, etc., as buffer to maintain pH in the range of 4.0–6.0 during polymerization.

The water dispersion of the ethylenically unsaturated fatty esterification reaction product is prepared without the use of a film-forming emulsifying agent such as a water soluble alkyd, but with an anionic surface active agent, preferably in combination with a nonionic surface active agent. In the examples set forth hereinafter, the anionic agent is sodium octylphenoxy polypropylene oxide sulfonate containing about 20 propylene oxide groups per molecule and the non-ionic agent is octylphenoxy polyoxypropylene ethanol containing about 10 propylene oxide groups per molecule. While these specific agents are preferred, other anionic agents are illustrated by sodium dioctyl sulfosuccinate and sodium lauryl sulfate. Appropriate commercial compositions are Triton X–200 and Duponol ME. Other non-ionic agents are illustrated by nonyl phenoxy polyoxyethylene ethanol. Appropriate commercial compositions are Triton X–100, Igepal CO–613, Tergitol NPX and Tergitol NP–14. The anionic surface active agent when used alone is preferably added in amounts of from 0.5% to 3% by weight, based on the total weight of the emulsion product produced in accordance with the invention. When the anionic surface active agent is used in combination with the non-ionic surface active agent, it is preferably added in amounts of from 0.5% to 2% by weight. The non-ionic surface active agent is preferably used in amounts of from 1% to 4% by weight.

The examples which are set forth hereinafter are generally in accord with the following basic procedure:

Emulsion composition

| | Percent |
|---|---|
| Water | 40–80 |
| Anionic surface active agent | 0.5–2 |
| Non-ionic surface active agent | 1–4 |
| Ethylenically unsaturated fatty esterification reaction product | 5–50 |
| Vinyl and/or acrylic monomer | 50–80 |
| Water soluble catalysts | 0.05–1 |
| Monomer soluble catalysts | 0.05–1 |
| Buffer (pH regulator) | 0.05–1 |

The general procedure of preparation is as follows:

The fatty esterification reaction product is pre-emulsified in a blender with the surface active agents and the monomer soluble catalyst using 20–25% of the water. The pre-emulsion is added to a reactor equipped with an agitator, condenser, cooling and heating coils and addition tubes for the vinyl or acrylic monomers and catalyst used and charged with 70–75% of the water soluble catalyst and a pH regulator. The mixture in the reactor is heated to about 180–185° F. and a premix of vinyl and/or acrylic monomer is added gradually over a 2–2½ hour period. After the addition of vinyl and/or acrylic monomer is complete, a small amount of additional water soluble catalyst is added to insure complete reaction and the mixture is held at 180–190° F. for ½–1 hour. The pH of the so formed product is adjusted to pH 8.5–9.5 using a 28% solution of ammonium hydroxide.

The invention is specifically illustrated in the examples which follow in which all parts are by weight.

EXAMPLE I.—PREPARATION OF UNSATURATED FATTY ALCOHOL ESTER

A reactor equipped with a thermometer, heating mantel, condenser, nitrogen inlet, Dean-Stark trap and stirrer is charged with:

| | Grams |
|---|---|
| Linoleyl fatty alcohol* | 567 |
| Crotonic acid | 190 |
| Xylol as reflux solvent | 30 |

*Linoleyl fatty alcohol, 9:10, 12:13 octadecadienol has a molecular weight of 266.

The charge is heated to 400° F. and held for an acid value of 35. The temperature is raised to 420° F. and held for an acid value of less than 20.

The ester which is formed contains crotonic unsaturation and two double bonds in the fatty alcohol chain and has the following physical characteristics:

| | |
|---|---|
| Solids (percent) | 100 |
| Viscosity (Gardner) | A— |
| Acid value | 17 |
| Weight per gallon lbs | 7.2 |

EXAMPLE II

Preparation of an emulsion copolymer using the monomer of Example I:

Emulsion composition

| | Percent |
|---|---|
| Unsaturated monomer of Example I | 9.7 |
| Ethyl acrylate | 59.3 |
| Methyl methacrylate | 29.5 |
| Glacial methacrylic acid | 1.5 |

Charge composition

| | |
|---|---|
| Water | 1300 |
| Potassium persulfate | 4.5 |
| Sodium bicarbonate | 1.5 |
| Unsaturated monomer of Example I | 135 |
| Anionic emulsifier (100% active sodium alkyl aryl polyether sulfonate) | 25 |
| Non-ionic emulsifier (100% active alkyl aryl polyether alcohol) | 39 |
| Benzoyl peroxide | 4.5 |
| Water | 300 |
| Ethyl acrylate | 810 |
| Methyl methacrylate | 405 |
| Glacial methacrylic acid | 20 |
| Ammonium hydroxide (28%) | 23 |

Procedure of polymerization.—135 grams of the unsaturated monomer of Example I is pre-emulsified with 25 grams anionic emulsifier, 39 grams non-ionic emulsifier, and 4.5 gram benzoyl peroxide in 300 grams of water. This pre-emulsion is added to a reactor charged with 1300 grams of water, 4.5 grams of potassium persulfate and 1.5 grams of sodium bicarbonate and heated to 180–185° F.

810 grams of ethyl acrylate, 405 grams of methyl methacrylate and 20 grams of glacial methacrylic acid are premixed and added gradually to the heated emulsion in the reactor over a 2½ hour period.

After the addition is complete, the heating is continued for one hour at 180–190° F. The product is cooled to 90° F. and 23 grams of ammonium hydroxide (28% solution) is added.

The final characteristics of the emulsion are:

Solids (percent) _____ 43.5
Viscosity (centipoises) _____ 60
pH _____ 9.3
Weight per gallon _____lbs__ 8.8

This emulsion has excellent stability with no settling, creaming or increase in viscosity after storage for one year at room temperature.

EXAMPLE III.—PREPARATION OF UNSATURATED FATTY ACID ESTER

A reactor equipped with a thermometer, Dean-Stark trap, heating mantel, condenser, nitrogen inlet and stirrer is charged with:

Grams
Glycerol allyl ether _____ 400
Dehydrated castor fatty acids _____ 800
Xylol as reflux solvent _____ 36

The charge is heated to 400° F. and held for an acid value of less than 2.

The ester which is formed contains allyl unsaturation and conjugated double bonds and has the following physical characteristics:

Solids (percent) _____ 100
Acid value _____ 1.9
Weight per gallon _____lbs__ 7.86

EXAMPLE IV

Preparation of an emulsion copolymer using the monomer of Example III:

Emulsion composition

Percent
Unsaturated monomer of Example III _____ 19.7
Ethyl acrylate _____ 49.3
Methyl methacrylate _____ 29.5
Glacial methacrylic acid _____ 1.5

Charge composition

Water _____ 1200
Potassium persulfate _____ 4.5
Sodium bicarbonate _____ 1.5
Oil base water insoluble monomer of Ex. III _ 270
Anionic emulsifier (sodium alkyl aryl polyether sulfonate—100% active) _____ 25
Non-ionic emulsifier (alkyl aryl polyether alcohol—100% active) _____ 39
Benzoyl peroxide _____ 4.5
Water _____ 350
Ethyl acrylate _____ 675
Methyl methacrylate _____ 405
Glacial methacrylic acid _____ 20
Benzoyl peroxide _____ 1.5
Ammonium hydroxide (28%)-solution _____ 28

The emulsion copolymer is prepared using the same procedure as in Example II. The product so formed has the following physical characteristics:

Solids (percent) _____ 43.7
Viscosity (centipoises) _____ 64
pH _____ 8.9
Weight per gallon _____lbs__ 8.74

EXAMPLE V

Example IV is repeated replacing the unsaturated monomer of Example III with an acrylic ester, ethyl acrylate.

Emulsion composition

Percent
Ethyl acrylate _____ 69
Methyl methacrylate _____ 29.5
Glacial methacrylic acid _____ 1.5

The charge composition is the same as Example IV except for an additional 19.7% ethyl acrylate and the emulsion copolymer is prepared using the same procedure as Example II.

The product so formed has the following physical characteristics:

Solids (percent) _____ 44.0
Viscosity (centipoises) _____ 35
pH _____ 9.1
Weight per gallon _____lbs__ 8.8

The products of Example IV and Example V are applied over glossy varnished surfaces. The product of Example IV has superior flow and gloss properties as compared with product of Example V. The product of Example V has very poor adhesion to glossy varnished surfaces and the film can be easily stripped off the surface. The product of Example IV has very good adhesion to glossy surfaces.

EXAMPLE VI.—PREPARATION OF UNSATURATED FATTY ALCOHOL ESTER

A reactor equipped with a thermometer, heating mantel, condenser, nitrogen inlet, Dean-Stark trap and stirrer is charged with:

Grams
Linoleyl fatty alcohol _____ 1080
Crotonic acid _____ 344
Xylol as reflux solvent _____ 30

The charge is heated to 400° F. and held for an acid value of 24–25 and the xylol is distilled off.

The product which is formed contains crotonic unsaturation and two double bonds in the fatty alcohol chain and has the following physical characteristics:

Solids (percent) _____ 99
Viscosity (Gardner) _____ A—
Acid value _____ 24
Weight per gallon _____lbs__ 7.24

EXAMPLE VII

This example describes the preparation of an emulsion copolymer utilizing only an anionic surface active agent emulsifier system.

Emulsion Composition

Percent
Unsaturated monomer of Example VI _____ 6.57
Ethyl acrylate _____ 45.98
Methyl methacrylate _____ 45.98
Glacial methacrylic acid _____ 1.46

Charge composition

Water _____ 1150
Potassium persulfate _____ 4.5
Sodium bicarbonate _____ 1.5
Fatty alcohol ester of Example VI _____ 90
Benzoyl peroxide _____ 4.5
Water _____ 250
Anionic emulsifier 30% solution in water ____ 225
Ethyl acrylate _____ 630
Methyl methacrylate _____ 630
Glacial methacrylic acid _____ 20
Ammonium hydroxide (28%)-solution _____ 25

90 grams of the ester of Example VI is pre-emulsified in a blender along with 225 grams of a 30% water solution of sodium alkyl aryl polyether sulfonate, 4½ grams of benzoyl peroxide and 250 grams of water. This pre-emulsion is added to a reactor equipped with an agitator, nitrogen inlet and thermometer and charged with 1150 grams of water, 4½ grams of potassium persulfate and 1½ grams of sodium bicarbonate. This mixture is heated to 180–185° F. under a light nitrogen sparge.

A premix of 630 grams of ethyl acrylate, 630 grams of methyl methacrylate and 20 grams of glacial methacrylic acid is added gradually to the heated mixture over a 2½ hour period. After the addition is complete, the mixture is held at 180–185° F. for one hour. The mixture is cooled to 90° F. and 23 grams of ammonium hydroxide (28% solution) is added.

The final characteristics of the emulsion are:

| | |
|---|---|
| Solids (percent) | 47.7 |
| Viscosity (centipoises) | 20.5 |
| pH | 9.35 |
| Weight per gallon lbs | 9.0 |

EXAMPLE VIII

Preparation of an emulsion copolymer using the ester of Example VI:

Emulsion composition

| | Percent |
|---|---|
| Ester of Example VI | 9.82 |
| Vinyl toluene | 53.82 |
| Ethyl acrylate | 34.91 |
| Glacial methacrylic acid | 1.45 |

Charge composition

| | |
|---|---|
| Water | 1200 |
| Potassium persulfate | 4.5 |
| Sodium bicarbonate | 1.5 |
| Ester of Example VI | 135 |
| Alkyl aryl polyether alcohol—100% active | 90 |
| Sodium alkyl aryl polyether sulfonate—100% active | 25 |
| Water | 300 |
| Benzoyl peroxide | 4.5 |
| Vinyl toluene | 740 |
| Ethyl acrylate | 480 |
| Glacial methacrylic acid | 20 |
| Ammonium hydroxide (28% solution) | 25 |

The emulsion copolymer is prepared using the same procedure as Example VII. The product so formed has the following physical characteristics:

| | |
|---|---|
| Solids (percent) | 45.8 |
| Viscosity (centipoises) | 10 |
| pH | 9.2 |
| Weight per gallon lbs | 8.54 |

EXAMPLE IX.—PREPARATION OF UNSATURATED LINSEED FATTY ACID ESTER

A reactor equipped with a thermometer, Dean-Stark trap, heating mantel, reflux condenser, nitrogen inlet tube and stirrer is charged with:

| | Grams |
|---|---|
| Trimethylol propane monoallyl ether | 900 |
| Linseed oil fatty acid | 1500 |
| Xylol as reflux solvent | 60 |

The charge is heated to 400° F., the water of esterification is distilled off and the charge is held for an acid value of 5–7.

The so formed ester has the following physical characteristics:

| | |
|---|---|
| Solids (percent) | 95 |
| Acid value (non-volatile) | 5.5 |
| Color (Gardner) | 7 |

EXAMPLE X

Preparation of an emulsion copolymer using the ester of Example IX:

Emulsion composition

| | Percent |
|---|---|
| Ester of Example IX | 6.98 |
| Ethyl acrylate | 58.91 |
| Methyl methacrylate | 32.56 |
| Glacial methacrylic acid | 1.55 |

Charge composition

| | |
|---|---|
| Water | 1200 |
| Potassium persulfate | 4.5 |
| Sodium bicarbonate | 1.5 |
| Ester of Example IX | 90 |
| Anionic emulsifier (sodium alkyl aryl polyether sulfonate 100% active) | 25 |
| Non-ionic emulsifier (alkyl aryl polyether alcohol 100% active) | 39 |
| Water | 300 |
| Benzoyl peroxide | 4.5 |
| Ethyl acrylate | 760 |
| Methyl methacrylate | 420 |
| Glacial methacrylic acid | 20 |
| Ammonium hydroxide (28% solution) | 12 |

The emulsion copolymer is prepared using the same procedure as Example VII. The product so formed has the following physical characteristics:

| | |
|---|---|
| Solids (percent) | 43.3 |
| Viscosity (centipoises) | 3.8 |
| pH | 9.1 |
| Weight per gallon lbs | 8.8 |

It will be understood that the invention is illustrated, but not limited by the specific examples presented hereinbefore. It will also be evident that the products of the invention are primarily useful in the coating art and as such they may be pigmented or contain dyes and various other components as will be evident to those skilled in the art.

The compositions of the present invention are capable of providing emulsion paints having gloss or semi-gloss characteristics and this is a feature of the invention. However, if a flat or non-glossy coating is desired, this may be formulated using flatting agents as is well known to those skilled in the art.

The invention is defined in the claims which follow.

We claim:

1. A water based copolymer emulsion of fine particle size providing gloss and semi-gloss characteristics and exhibiting good adhesion to glossy and varnished surfaces which comprises dispersed particles of a copolymer of:
   (1) from 5–40% by weight based on the total weight of the copolymer of an ethylenically unsaturated fatty esterification reaction product selected from the group consisting of:
      (a) the esterification reaction product of an unsaturated fatty acid with an alpha,beta-ethylenically unsaturated alcohol;
      (b) the esterification reaction product other than that defined in (a) above of an unsaturated fatty alcohol with an alpha,beta-ethylenically unsaturated acid; and
      (c) mixtures of (a) and (b); and
   (2) from 1–4% by weight based on the total weight of the copolymer of a monoethylenically unsaturated carboxylic acid copolymerizable with said esterification reaction product; and
   (3) from 60–90% by weight based on the total weight of the copolymer of at least one monoethylenically unsaturated monomer containing the

group other than that set forth in component (2) above, copolymerizable with said esterification reaction product and said acid.

2. A water based copolymer emulsion as recited in claim 1 in which said ethylenically unsaturated fatty esterification reaction product contains an unsaturated $C_4$–$C_{20}$ aliphatic group.

3. A water based copolymer emulsion as recited in claim 1 in which said ethylenically unsaturated fatty esterification reaction product is a low molecular weight ester selected from the group consisting of mono- and diesters.

4. A substrate having as a coating thereon a hardened resinous composition of claim 1.

5. A method of producing a water based copolymer emulsion of fine particle size exhibiting good adhesion to glossy and varnished surfaces which comprises, forming an oil-in-water emulsion consisting essentially of dispersed oil particles of:
 (1) an ethylenically unsaturated fatty esterification reaction product selected from the group consisting of:
  (a) the esterification reaction product of an unsaturated fatty acid with an alpha,beta-ethylenically unsaturated alcohol;
  (b) the esterification reaction product other than that defined in (a) above, of an unsaturated fatty alcohol with an alpha,beta-ethylenically unsaturated acid; and
  (c) mixtures of (a) and (b); and said oil particles being maintained in dispersion by
 (2) dispersing agent consisting essentially of surface active agent selected from the group consisting of anionic surface active agents and mixtures of anionic and non-ionic surface active agents; and incrementally adding thereto under conditions producing addition copolymerization, at least one monoethylenically unsaturated monomer copolymerizable with said esterification reaction product to form a water based copolymer emulsion of fine particle size.

6. The emulsion product produced by the method of claim 5.

7. A water based copolymer emulsion as recited in claim 1 in which said component (3) consists predominantly of ethyl acrylate and methyl methacrylate.

8. A method as recited in claim 5 in which said oil-in-water emulsion includes monomer soluble polymerization catalyst and the mixture is heated to reaction temperature whereupon a mixture of the monoethylenically unsaturated monomers to be copolymerized with said esterification reaction product is added incrementally to said heated mixture.

References Cited

UNITED STATES PATENTS 2,527,597  10/1950  Swern et al.
2,941,968   6/1960  McKenna.
2,992,197   7/1961  Boller.

OTHER REFERENCES

Schildknecht: Polymer Processes, vol. X, Interscience (1956), pp. 134 and 135.

MURRAY TILLMAN, Primary Examiner

W. J. BRIGGS, Sr., Assistant Examiner

U.S. Cl. X.R.

260—78.5, 80.8, 86.1

PO-1050
(5/69)

UNITED STATES PATENT OFFICE
CERTIFICATE OF CORRECTION

Patent No. 3,470,126      Dated September 30, 1969

Inventor(s) Kazys Sekmakas and Roland F. Stancl

It is certified that error appears in the above-identified patent and that said Letters Patent are hereby corrected as shown below:

Column 2, line 57, "methacrylate" should read --methacrylamide--

Column 4, line 67, "gram" should read --grams--

Column 8, claim 1, last line, the period should be changed to a semi-colon, and the following material added:

--dispersed particles of copolymer being stabilized in said emulsion by dispersing agent consisting essentially o surface active agent selected from the group consisting of anionic surface active agents and mixtures thereof with non-ionic surface active agents.--

SIGNED AND
SEALED
MAY 12 1970

(SEAL)
Attest:

Edward M. Fletcher, Jr.
Attesting Officer

WILLIAM E. SCHUYLER, JR.
Commissioner of Patents